United States Patent
Gourraud

(10) Patent No.: US 9,254,615 B2
(45) Date of Patent: Feb. 9, 2016

(54) METHOD AND AN APPARATUS FOR MANUFACTURING AN OPTICAL LENS

(75) Inventor: Alexandre Gourraud, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 657 days.

(21) Appl. No.: 13/141,686

(22) PCT Filed: Dec. 22, 2009

(86) PCT No.: PCT/EP2009/067730
§ 371 (c)(1),
(2), (4) Date: Jun. 22, 2011

(87) PCT Pub. No.: WO2010/072749
PCT Pub. Date: Jul. 1, 2010

(65) Prior Publication Data
US 2011/0257930 A1   Oct. 20, 2011

(30) Foreign Application Priority Data
Dec. 22, 2008  (EP) .................................. 08305999

(51) Int. Cl.
*B29D 11/00* (2006.01)
*B24B 13/005* (2006.01)
*B24B 47/22* (2006.01)

(52) U.S. Cl.
CPC ........ *B29D 11/00009* (2013.01); *B24B 13/005* (2013.01); *B24B 47/225* (2013.01); *Y10T 29/49998* (2015.01)

(58) Field of Classification Search
CPC ................................................ B29D 11/00942
USPC .......................................................... 702/150
See application file for complete search history.

(56) References Cited

U.S. PATENT DOCUMENTS

| | | | | |
|---|---|---|---|---|
| 4,438,602 A | * | 3/1984 | Lannom ............... | B24B 13/0052 451/390 |
| 5,283,980 A | * | 2/1994 | Lohrenz et al. ................... | 451/5 |
| 5,425,665 A | * | 6/1995 | Kennedy ............. | B24B 13/0055 451/390 |
| 5,485,399 A | * | 1/1996 | Saigo ..................... | B24B 9/148 345/420 |
| 5,523,836 A | * | 6/1996 | Minix ............... | G01M 11/0228 356/124 |

(Continued)

FOREIGN PATENT DOCUMENTS

| | | |
|---|---|---|
| CN | 1946543 | 4/2007 |
| CN | 101046521 | 10/2007 |

(Continued)

*Primary Examiner* — Regis Betsch
(74) *Attorney, Agent, or Firm* — Cozen O'Connor

(57) ABSTRACT

A method of manufacturing an optical lens, the method comprising the steps of blocking a lens member at a first position on a blocker; determining the first position of the lens member with respect to the blocker; comparing the first position of the lens member with a predetermined position in order to determine a positioning error between the first position and the predetermined position; determining a surface position of the surface to be manufactured with respect to the blocker according to the positioning error; and configuring operational parameters of a lens manufacturing tool in order to manufacture a surface according to the determined surface position such that the desired optical properties of the optical lens are respected. The invention further relates to an apparatus for manufacturing an optical lens.

17 Claims, 8 Drawing Sheets

(56) References Cited

U.S. PATENT DOCUMENTS

| | | | | |
|---|---|---|---|---|
| 6,012,965 | A * | 1/2000 | Savoie | 451/6 |
| 6,301,009 | B1 | 10/2001 | Tinker | |
| 7,440,814 | B2 | 10/2008 | McPherson et al. | |
| 2008/0026679 | A1* | 1/2008 | Siders | B24B 13/06 451/42 |
| 2009/0125137 | A1* | 5/2009 | Allione et al. | 700/97 |
| 2011/0257930 | A1* | 10/2011 | Gourraud | 702/150 |

FOREIGN PATENT DOCUMENTS

| | | |
|---|---|---|
| CN | 101234514 | 8/2008 |
| EP | 1 194 267 | 4/2002 |
| EP | 1 719 584 | 11/2006 |
| FR | 2 900 246 | 10/2007 |
| GB | 2 255 636 | 11/1992 |

* cited by examiner

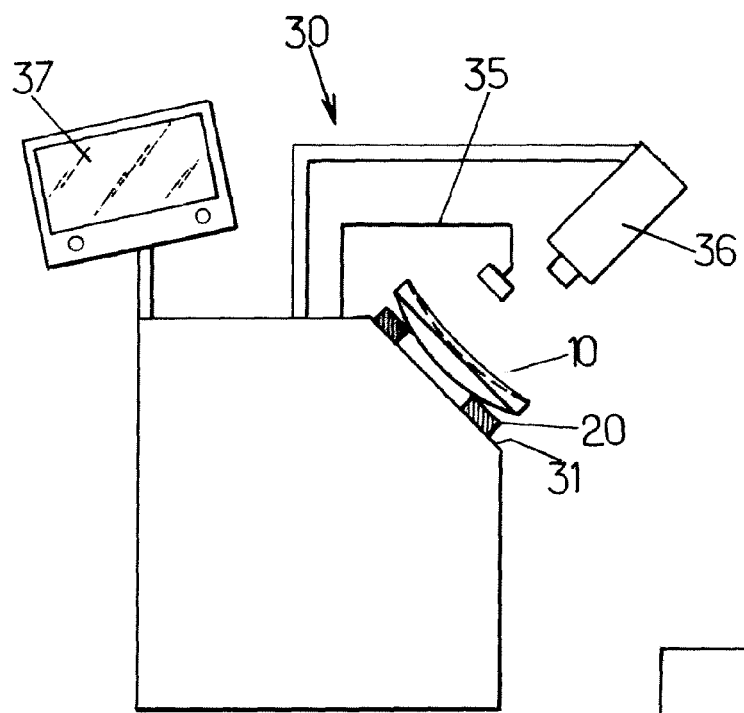
FIG.3.
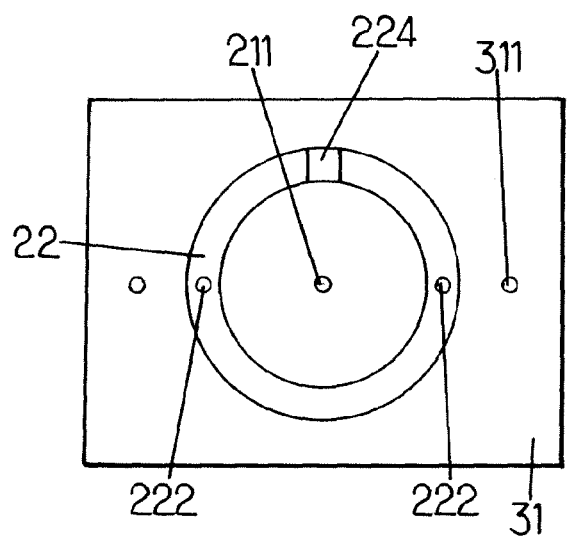
FIG.4.
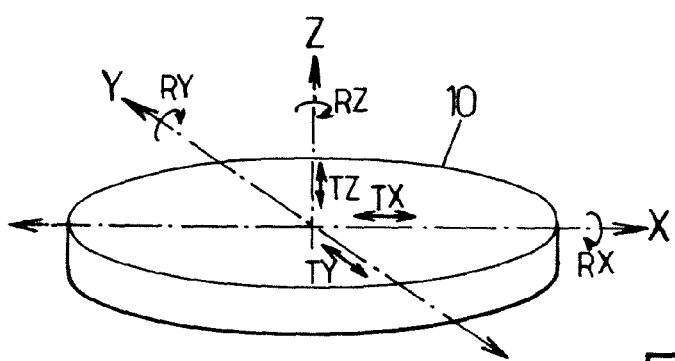
FIG.6.
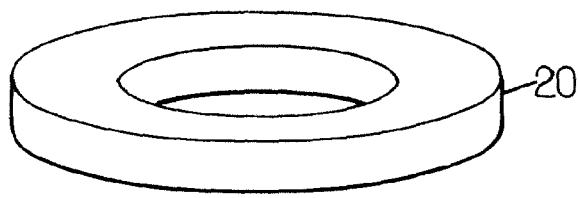

METHOD AND AN APPARATUS FOR MANUFACTURING AN OPTICAL LENS

RELATED APPLICATIONS

This is a U.S. National Phase Application under 35 USC 371 of International Application PCT/EP2009/067730 filed on Dec. 22, 2009.

This application claims the priority of European Application No. 08305999.8 filed Dec. 22, 2008, the entire content of which is hereby incorporated by reference.

FIELD OF THE INVENTION

The present invention relates to a method of manufacturing an optical lens. Particularly, but not exclusively, the invention relates to a method of blocking an optical lens at a positioning for manufacturing of the lens. The invention further relates to an apparatus for manufacturing an optical lens.

BACKGROUND OF THE INVENTION

An optical lens is typically made of plastic or glass material and generally has two opposing surfaces which co-operate with one another to converge or diverge light according to a required corrective prescription. When the positioning or shape of one of these surfaces with respect to the other is inaccurate, optical errors can be created.

Manufacturing of an optical lens to the required prescription requirements typically includes machining the surface of a semi finished lens or lens blank. Typically, a semi-finished lens has a finished front surface and an unfinished back surface. By machining the back surface of the lens to remove material, the required shape and positioning of the back surface with respect to the front surface for the desired corrective prescription can be generated. Further surfacing operations of an optical lens can include chamfering, bevelling, polishing, or coating the surface of a lens member in order to modify the optical surface. Cribbing of the optical lens involves providing the peripheral edge of the optical lens with the desired contour for the finished optical or ophthalmic lens.

During manufacturing of the lens it is important that the semi finished lens is securely maintained at a correct positioning on a support block during the various manufacturing operations in order to prevent the generation of optical errors. Current techniques for ensuring that the positioning of a lens member with respect to a blocking support is as accurate as possible during manufacturing of an optical lens includes verifying the positioning during the blocking step by methods ranging from an operator visualising the lens positioning directly or by means of a camera, and then correcting the positioning if necessary to fully automated verification and positioning correcting processes. Fully automated positioning methods are becoming progressively complex and time consuming. EP 1194267 describes a method implementing machine vision and probing equipment to generate an accurate virtual entity of a lens blank. The virtual entity is used throughout the lens generation process for calculating and selecting lens angles, tool angles and tool paths that produce the best lens quality

SUMMARY OF THE INVENTION

In accordance with a first aspect of the invention there is provided a method of manufacturing an optical lens. The method includes the steps of blocking a lens member at a first positioning on a blocker; determining the first positioning of the lens member with respect to the blocker; comparing the first positioning of the lens member with a predetermined positioning in order to determine a positioning error between the first positioning and the predetermined positioning; determining a surface positioning of the surface to be manufactured with respect to the blocker according to the positioning error; and configuring operational parameters of a lens manufacturing tool in order to manufacture a surface according to the determined surface positioning such that the desired optical properties of the optical lens are respected.

The method according to an embodiment of the invention includes compensating for a positioning error rather than repositioning a lens member in order to reduce the error. There is no impact on the actual blocking operation since the compensation for the error in compensation can be performed by software, and thus no modifications to the physical blocking equipment are necessary for the method to be implemented. The acceptable tolerances for positioning errors may be increased since the errors are compensated for.

By compensating in such a manner for errors in positioning, the optical quality of machined optical lens can be improved, particularly in the manufacture of dual side lens by reducing the dispersion related to the blocking stage of the manufacturing operation. This dispersion can result from incorrect positioning of one surface of an optical lens with respect to an opposing surface.

In one or more embodiments the step of determining the first positioning of the lens member may include the steps of determining the orientation of the nasal-temporal axis of the lens member and the decentration of the lens member with respect to the blocker and wherein the geometry of the surface of the lens member in contact with the blocker and the geometrical configuration of the blocker ring supporting the lens member may be used to determine the positioning of the lens member with respect to the blocker in terms of six degrees of freedom.

Determining the first positioning of the lens member may include the step of determining the positioning of the lens reference markings on an opposing surface of the lens member to the surface being manufactured with respect to blocker reference markings on the blocker.

In one or more embodiments the method may include viewing the lens reference markings through the lens member and taking into account the refractive properties of the lens member are taken into account when determining the positioning of the viewed lens reference markings.

The method may further include rotating the surface to be manufactured so that the normal of the surface to be manufactured at the manufacturing axis of rotation is co-linear with the manufacturing axis of rotation, and providing a blocking prism to orientate the lens member so as to compensate for the rotation.

A second aspect of the invention provides an apparatus for manufacturing an optical lens, the apparatus comprising a blocker for blocking a lens member at a first positioning; a processor for determining the first positioning of the lens member with respect to the blocker; comparing the first positioning of the lens member with a predetermined positioning in order to determine a positioning error between the first positioning and the predetermined positioning; determining the surface positioning of the surface to be manufactured according to the positioning error; and configuring operational parameters of a lens manufacturing tool according to the positioning error in order to manufacture a surface according to the determined surface positioning such that the desired optical properties of the optical lens are respected.

The processor may be operable to determine the positioning of the lens member by measuring the orientation of the nasal-temporal axis of the lens member and the decentration of the lens member, with respect to the blocker wherein the geometry of the surface of the lens member in contact with the blocker and the geometrical configuration of the blocker ring supporting the lens member may be used to determine the positioning of the lens member with respect to the blocker in terms of six degrees of freedom.

The processor may also be operable to calculate the positioning error by determining the positioning of the lens reference markings on an opposing surface of the lens member to the surface being manufactured with respect to blocker reference markings on the blocker.

The apparatus may include a digital camera operable to view the markings through the lens member and wherein the processor is operable to take into account the refractive properties of the lens member when determining the positioning of the lens surface markings The processor may be operable to rotate the surface to be manufactured so that the normal of the surface to be manufactured is co-linear with the manufacturing axis of rotation and the blocker is arranged to include a blocking prism to compensate for the rotation.

The method according to the invention may be computer implemented. The method may be implemented in software on a programmable apparatus. It may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

In the context of the present invention the term "lens member" can refer to a lens blank, an uncut lens, a semi-finished lens or a finished optical lens. It will be understood that the method can thus be applied to any stage of the manufacturing process of an ophthalmic lens.

The blocking method according to the embodiments of the invention can be used to block an optical lens at a given positioning for manufacturing processes. The optical lens may be, for example, but not limited to an ophthalmic lens, in particular an unfinished or semi-finished ophthalmic lens. More generally, the optical lens may be any optical lens component, for example, for use in a camera or telescope.

It will be appreciated that the blocking method may be used at different stages of the manufacturing process of an optical lens. The manufacturing process may be a machining operation, which may be, for example, but not limited to a cribbing operation, a surfacing operation, a roughing operation, a fining operation, a coating operation, an edging operation, a grinding operation or a polishing operation.

BRIEF DESCRIPTION OF THE DRAWINGS

Embodiments of the invention will now be described, by way of example only, and with reference to the following drawings in which:

FIG. 3 is schematic view of a lens member on a blocking station according to the first embodiment of the invention;

FIG. 4 is a planar view of the contact surface of the blocking device and blocking plate of the blocking station of FIG. 3;

FIG. 6 is a perspective view of a lens member illustrating the reference frame of the lens member;

FIG. 13 is a schematic view illustrating the method according to embodiments of the invention compared to methods where a positioning error is not compensated for.

DETAILED DESCRIPTION

A first embodiment of a method and apparatus of manufacturing an optical lens from a semi finished lens will be described with reference to FIGS. 1A to 8B.

Figure 1A:
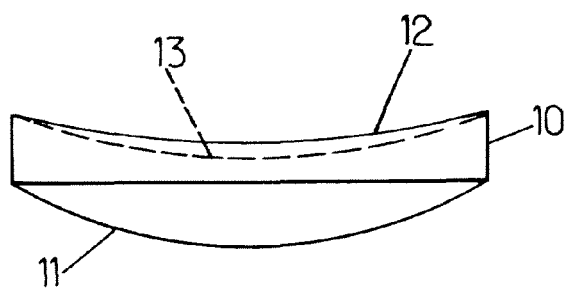
FIG. 1A is a perspective view of an optical lens member to be manufactured according to embodiments of the invention.
Figure 1B:
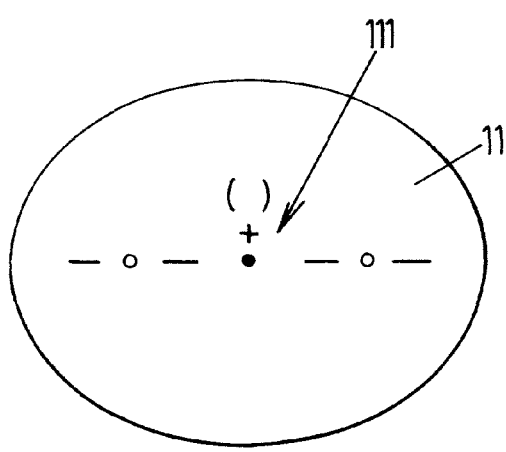
FIG. 1B is a planar view of a preformed surface of a semi finished lens member to be machined according to embodiments of the invention.

Semi finished lens member 10 has a preformed front surface 11 that, in use of the resulting finished optical lens, is disposed nearest the object being viewed and an opposing surface 12 to be modified by the manufacturing process to provide the back surface 13 of the finished optical lens, represented by the dotted line. Opposing surface 12 is machined by a machining tool so that the back surface 13 is orientated with respect to and distanced from the front surface 12, according to the required optical prescription. While in this embodiment of the invention, the back surface of the optical lens is formed by the machining process, it will be understood, that in alternative embodiments of the invention both or either surfaces of the lens may be formed by the machining process. Moreover, although the optical surface 13 to be manufactured is represented in FIG. 1A as concave, it will be appreciated that the optical surface 13 could equally well be convex or any other curved surface With reference to FIG. 1B, reference manufacturing markings 111 are provided on the preformed front surface 11 of the semi finished lens member 10 as reference features for positioning purposes. The manufacturing markings 111 are visible through the semi finished lens member 10 from the opposing side 12 of the lens member 10.

Figure 2A:
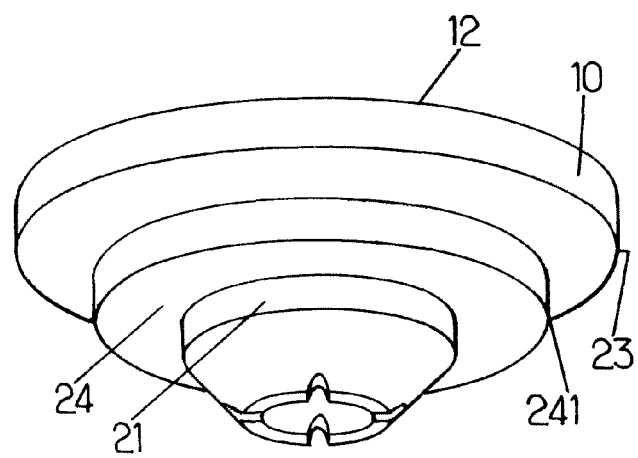
FIG. 2A is a cross-sectional view of a lens member and blocking device according to a first embodiment of the invention.
Figure 2B:
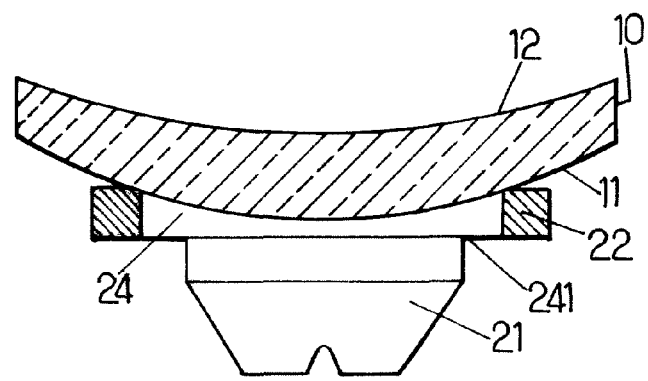
FIG. 2B is a perspective view of a lens member and blocking device according to the first embodiment of the invention.

Referring now to FIG. 2A and 2B, a lens blocking device 20 for blocking lens member 10 in the correct positioning for manufacturing processes comprises a blocker 21, a blocking ring 22 and a protection film 23 for placing between the front surface 11 of the lens member 10 and the blocking device 20. Blocking cast material 24 is poured into the cavity defined by the lower surface of the optical lens 10, the blocker 21 and the blocking ring 22. The blocking cast material 24 cools to solidify in order to provide a blocking support for the optical lens 10 at the desired positioning for machining. The lower surface or bearing surface 241 of blocking material 241 acts as a reference surface for determining the thickness at the centre of the lens member 10.

Lens blocking device 20 is part of a blocking station 30 as illustrated in FIG. 3. Blocking station 30 comprises the blocking device 20 disposed on a top plate 31 of the blocking station 30 and a clamping arm 35 which may be moved from a free position to a clamping position in which it holds the lens member 10 in place on the blocking device 20. Blocking station 30 also includes a digital camera 36 for taking an image of the positioning of the lens member 10 on the blocking device 20, and a screen 37 for viewing the image from the digital camera 36. The lens member 10 may also be directly viewed by an operator without using the digital camera 36.

Referring to FIG. 4, blocking device 20 is provided with blocker reference markings including alignment markings 222 provided on the blocking ring 22 and a central marking 211. In the case where an insert or a block is provided in the centre of the blocking ring, the central marking 211 is provided on the insert or block. The top plate 31 of the blocking station 30 is provided with reference markings 311 for guiding the positioning of the blocking ring 22 on the top plate 31. Alignment markings 222 on the ring may include a hole for receiving corresponding positioning projections on the top plate 31 allowing the ring 22 to be correctly positioned on the blocking plate 31. The alignment markings 222 may be further provided with a line markings following a reference axis to aid alignment.

Figure 5:
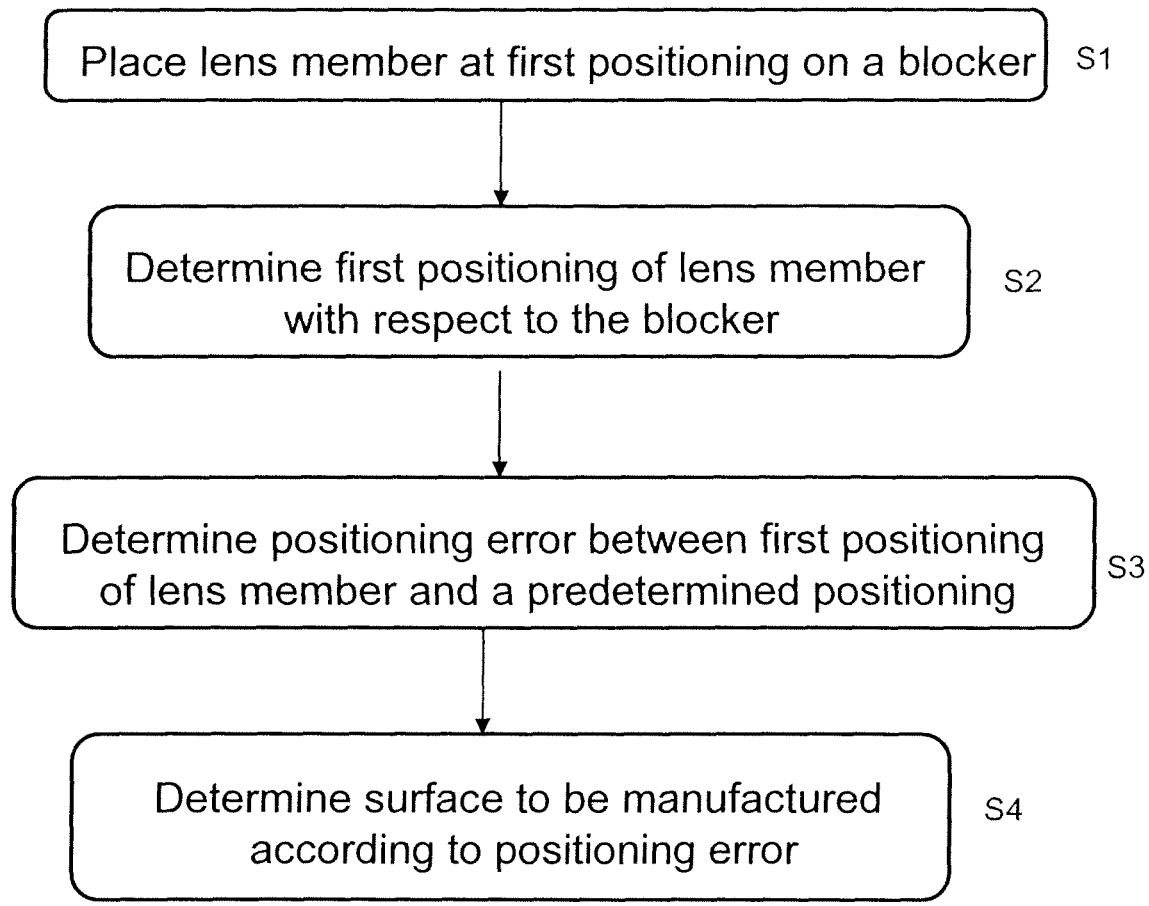
FIG. 5 is a flow chart of the steps of the method according to the first embodiment of the invention.

Prior to placing the semi finished lens member 10 on the lens blocking device 20 the protection film 23 is placed on the preformed front surface 11 of the lens member 10. With reference to FIG. 5 an initial step S1 of blocking an optical lens according to a first embodiment of the invention involves placing the semi finished lens member 10 on the lens blocking device 20. The lens member 10 is positioned on the blocking device 20 with the preformed surface, which in this case is the front surface 11, being placed facing towards and in contact with the blocking device 20. The surface 12 to be machined is thus orientated to face upwards away from the blocking device 20.

After the lens member 10 has been placed on the blocking device 20, the operator may make an initial judgement as to the quality of the positioning by direct visualisation of the reference markings 111 of lens member 10 with respect to the reference markings of the blocking device 20 before continuing the blocking process. If the operator is not satisfied with the initial positioning, the lens member 10 may be repositioned manually or automatically on the blocking device 20. Once the operator is satisfied with the positioning the clamping arm 35 may be put in place to hold the lens member 10 in position on the blocking device 20.

Figure 7:
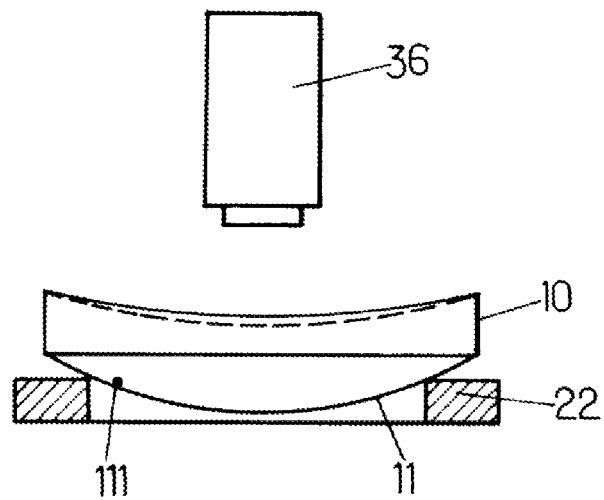
FIG. 7 is a schematic view of a digital camera viewing the lens member according to the first embodiment of the invention.
Figure 8A:
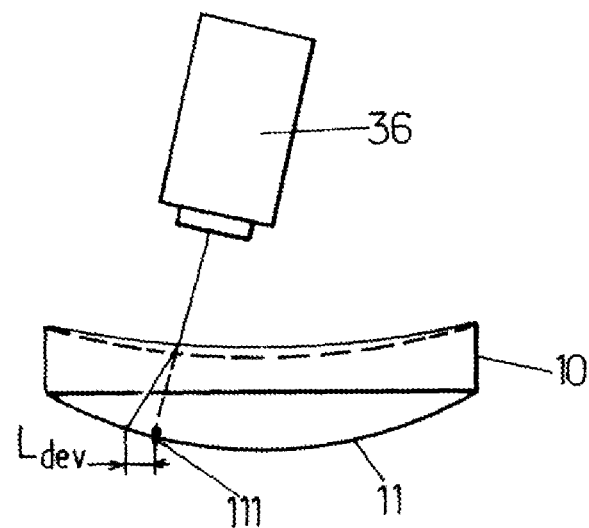
FIG. 8A schematically illustrates the effect of the refractive properties of the lens member 10 on the determination of the position of the reference markings of the lens member.

With reference to FIG. 6 the positioning of the lens member 10 in a reference frame on lens blocking device 20 can be defined by:

translation TX and TY in a horizontal plane XY with decentration TX, TY, defining the displacement of the centration point O of the lens in the X and Y direction, respectively in the horizontal plane;

translation TZ along a vertical axis, orientation RZ of the lens member about the vertical Z axis, also referred to as orientation of the nasal-temporal axis of the lens member;

orientation RY of the lens member about the horizontal Y axis, orientation RX of the lens member about the horizontal X axis, The positioning of lens member 10 on the blocking device 20 can then be quantified using the digital camera 36. In order to measure the positioning of the lens member 10, the reference markings 111 provided on the lower surface of the lens member and the reference markings 211 and 222 provided on the blocking device 20 are viewed through the lens member 10 and protection film 23 by means of the camera 36 which is positioned along the cylindrical axis extending through the central marking 211 of the blocking device 20 as illustrated in FIG. 7. Deviation $L_{dev}$ of the image of a reference point 111 located on the front surface 11 of the lens member 10 due to refractive properties of the lens member 10 is taken into account when making measurements of the positioning of reference markings 111 of the lens member 10 relative to the reference markings on the blocking ring 22 as illustrated in FIG. 8A.

Figure 9:
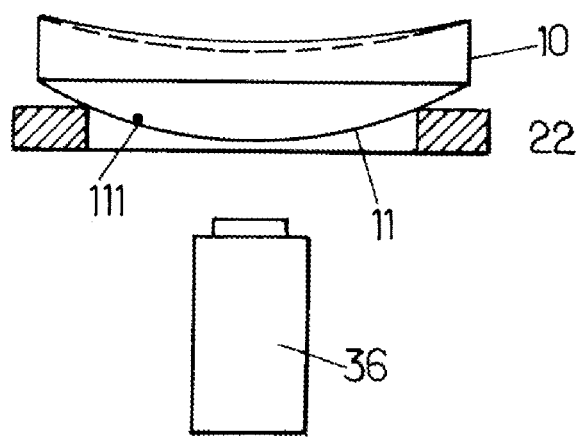
FIG. 9 is a schematic view of a digital camera viewing the lens member according to an alternative embodiment of the invention.

Although in this embodiment the reference markings 11 are viewed through the lens member 10, it will be appreciated that in alternative embodiments of the invention the reference markings may be viewed directly by placing the camera on the lower side of the blocking device 20 such that it views the reference markings on the blocking device 20 and the front surface 11 of the lens member as illustrated in FIG. 9.

The positioning of the reference markings 111 on the lower surface of the lens member relative to the reference markings 211 and 222 of the blocking device 20 is determined.

Figure 8B:
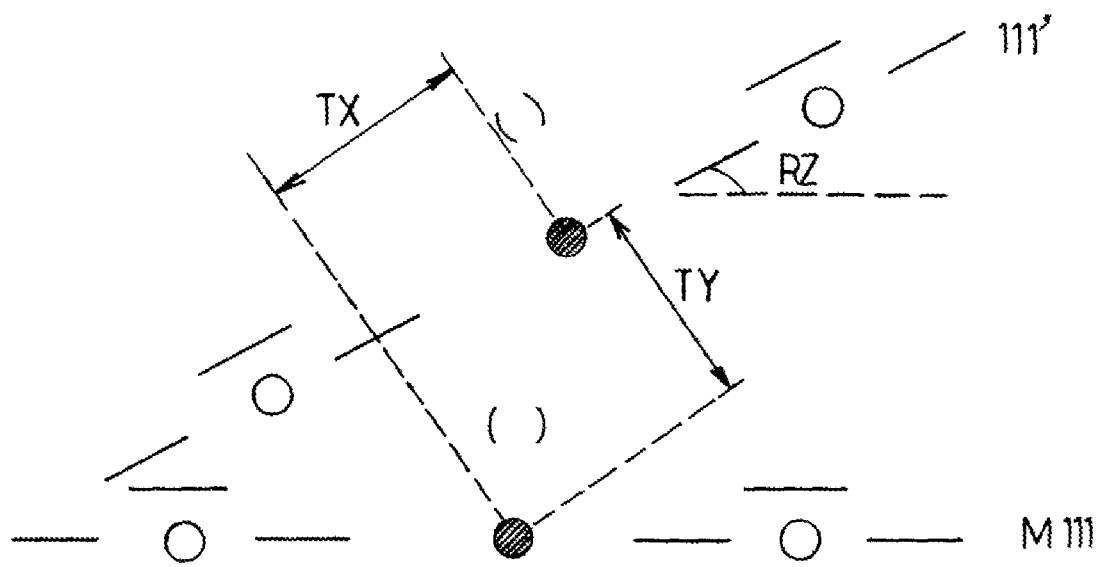
FIG. 8B schematically illustrates determining the positioning of the imaged reference markings according to the first embodiment of the invention.

The camera 36 places the image of the reference markings 111' in the reference frame of a model M111 of the reference markings corresponding to an optimised positioning of the lens member 10 as illustrated in FIG. 8B. The reference frame of the markings of model M111 is defined with respect to the reference frame of the blocking device 20 in a calibration step.

The orientation and direction of the nasal temporal axis RZ of the semi finished lens member 10 is determined by measuring the orientation of the axis of the reference markings 111' with respect to the axis of the model reference markings M111. Using the central reference point of the reference markings 111' the translation distances in the horizontal plane TX and TY can also be measured, i.e. the decentration or off centering of the lens member 10. This may be performed by calculating the transformation the image of the reference markings 111 is subjected to through the lens member 10.

Alternatively in the case of a decentred semi finished lens, by taking account of the nasal-temporal prism and then taking account of the scaling to which the image 111' of the reference markings 111 is subjected to through the lens member 10, knowing the distance between the reference markings 111 on the front surface 11 of the lens member 10, and knowing that the position of the reference markings may be interpolated. If $D_{mes}$ corresponds to the measured distance between the reference markings and $D_{th}$ is the theoretical distance between the reference markings the scaling factor can be determined as $r=D_{mes}/D_{th}$. The estimation of the decentration Tx and Ty then becomes $TX=TX_{mes} \times 1/r$ and $TY=TY_{mes} \times 1/r$ where TX$_{mes}$ and TY$_{mes}$ correspond to the measured translations TX and TY of the decentration respectively.

Once the three degrees of freedom RZ, TX and TY have been determined, the remaining three degrees of freedom TZ, RX and RY may be mathematically deduced therefrom by taking account of the geometry of the blocking ring 22, as well as the geometry of the preformed front face 12 of the lens member and knowing that the lens member is stably supported by at least three bearing points on the support ring 22.

Once the positioning of the lens member has thus been determined with respect to the blocker 21, in step S3 the determined positioning of the lens member 10 can then be compared with a predetermined optimised positioning in order to provide a measurement of the positioning error.

At this stage if the positioning error is not within a predetermined tolerance, the lens member may be repositioned before continuing and steps S2 to S3 may be repeated in order to determine the new positioning error.

Once the positioning error has been determined the actual positioning of the front surface 11 of the lens member 10 with respect to the blocking device 20 is known.

The required positioning of the surface 13 to be generated with respect to the reference blocker 21 can thus be deduced.

By configuring the machining tool according to the positioning error surface 12 can be machined to provide a surface 13 with the required positioning with respect to surface 11 to respect the thickness and desired optical characteristics of the desired optical lens. Configuring the machining tool involves providing the tool with surface positioning data so that the machining tool may be controlled to provide the desired surface positioning of the back surface.

Alternatively, completed surface data defining the surface to be manufactured can be sent directly to the machining tool. In this case the data defining the positioning of the surface 13 to be manufactured is determined from the positioning error prior to configuration data being delivered to the machining tool. The machining tool is configured accordingly.

Before the step of machining surface 12 to generate desired optical back surface 13, the cavity defined by the blocking ring 22, blocker 21 and lens member 10 is filled with the blocking material 24. When blocking material 24 has solidified to support the lens member 10 in the measured positioning the clamping arm 35 is then released. The blocked lens member 10 can then be mounted on a machining apparatus for the machining process. In step S4 the surface 13 to be manufactured for the optical lens can be determined. Machining apparatus is then configured to take into account the determined positioning error so that the machining tool can be positioned with respect to surface 12 in order to remove material in such a way that the desired surface 13 is generated at the desired positioning. An optical lens with optical properties conforming to the optical prescription can thus be created.

A second embodiment of the invention will now be described with reference to FIGS. 10 to 12.

Figure 10:
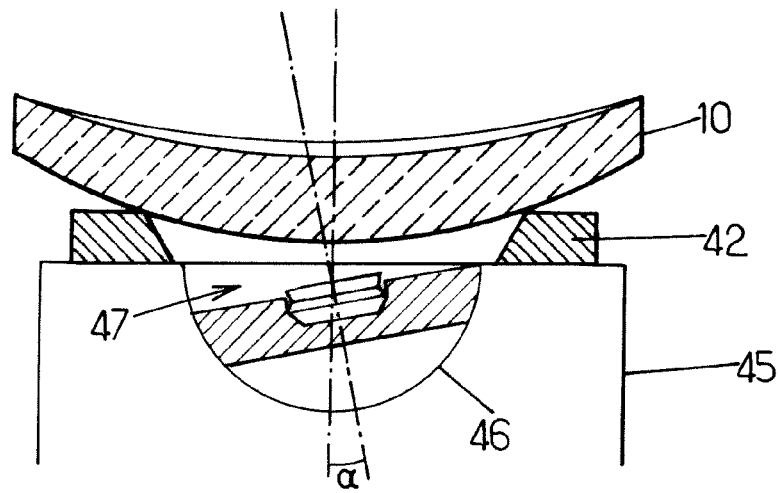
FIG. 10 is a cross sectional view of a lens member on a blocking device according to the second embodiment of the invention.

In this embodiment of the invention lens member 10 which is similar to semi finished lens member 10 of the previous embodiment is mounted on a prismatic blocking device 40 as illustrated in FIG. 10.

Prismatic blocking device 40 enables the lens device to be supported at a given inclination or tilt for the machining process and comprises casting block 45 having a recessed housing 46 in which blocking preform 41 is housed, and a blocking ring 42. Preform 41 may be inclined at an angle α to the vertical axis. Blocking cast material 44 is poured into the cavity 47 defined by the front surface 11 of the optical lens 10, housing 46 and inclined preform 41. When cooled the blocking cast material 44 solidifies to support the optical lens 10 at the desired prismatic orientation for machining. The lower surface or bearing surface 441 of blocking material 441 acts as a reference surface. Blocking device 40 is provided with reference markings similar to the reference markings of blocking device 20 of the previous embodiment for positioning purposes.

Figure 11:
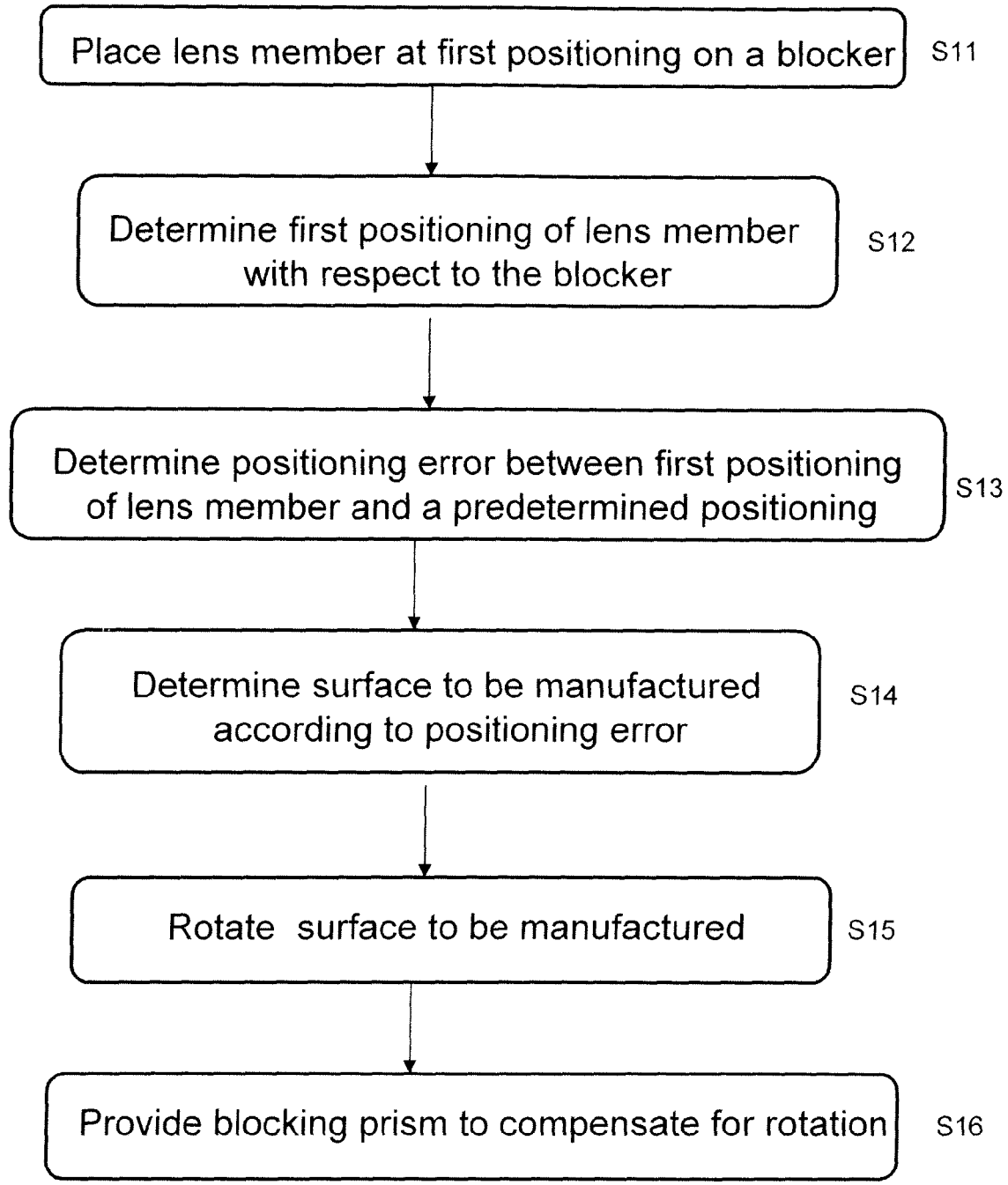
FIG. 11 is a flow chart of the steps of the method according to the second embodiment of the invention.

With reference to FIG. 11 an initial step S11 of manufacturing an optical lens according to the second embodiment of the invention involves placing the semi finished lens member 10 on the lens blocking device 40. The lens member 10 is positioned on the blocking device 40 with the preformed surface, which in this case is the front surface 11, being placed facing downwards and in contact with the blocking device 40. The surface 12 to be machined is thus orientated to face upwards away from the blocking device 20. In step S12 the positioning of the lens member 10 on the blocking device 40 is determined in a similar manner to step S2 of the previous embodiment. In step S13 the positioning error is determined in a similar manner to step S3 of the previous embodiment.

As in the previous embodiment the machining is configured to position the back surface taking account of the determined positioning error so that the optical properties of the optical lens to be manufactured are respected in step S14.

In the second embodiment in addition to re positioning of the back surface 13 to be generated in order to provide the required lens shape, the surface 13 to be generated can be rotated in step S15 in order that the normal to the surface to be manufactured at the machining axis of rotation is co-linear with the machining axis of rotation in order thereby ensuring that the surface is not prismed at the machining axis. In order to compensate for rotation of the surface 13 to be generated, in step S16 preform 41 is tilted at a prismatic angle α with respect to the vertical to provide a blocking prism. After the clamping arm 35 has been put in place blocking cast material 44 is poured into the cavity 47 defined by the front surface 11 of the optical lens 10, housing 46 and inclined preform 41. When cooled the metallic cast material 44 solidifies to support the optical lens 10 at the desired prismatic orientation for the machining process.

Figure 12:
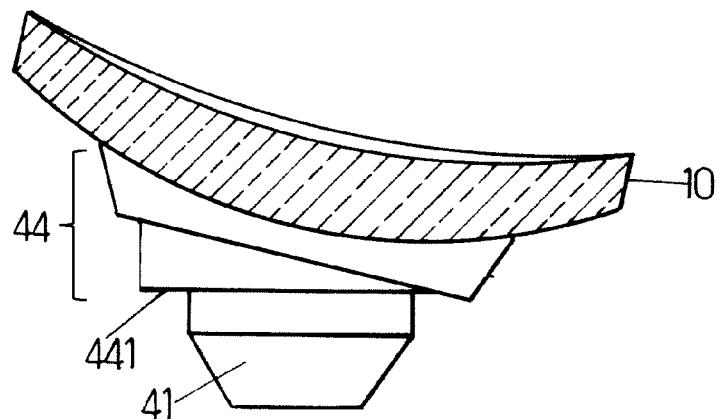
FIG. 12 is a cross sectional view of a lens member on a blocker for machining according to the second embodiment of the invention.

With reference to FIG. 12 the lens member is blocked by solidified support material 44 at a prismatic angle α for the machining process.

Although the present invention has been described hereinabove with reference to specific embodiments, the present invention is not limited to the specific embodiments, and modifications will be apparent to a skilled person in the art which lie within the scope of the present invention.

For instance, although in the foregoing embodiments of the invention the positioning error is determined after the clamping arm has been put in place and before the blocking material is poured into the cavity, it will be appreciated that the positioning error may be determined at different stages of the blocking procedure. For example, in other embodiments of the invention, the positioning of the lens member measured and the positioning error determined:

before the clamping arm is put in place;
after the clamping arm has been released and before the blocked semi finished lens member is removed from the blocking apparatus;
after the semi finished lens member has been mounted in the machining apparatus It will be appreciated that the estimation of the positioning error may be carried out at more than one stage during the blocking procedure. For example the positioning error may be determined before the cavity of the blocking device is filled by the blocking material and once again when the lens member is mounted on the machining apparatus While the foregoing examples have been described with reference to the manufacture of an ophthalmic lens, it will be appreciated that the method of the invention may be applied more generally to the manufacture of other types of optical lens, for example optical lens used in telescopes and the like.

Figure 13:
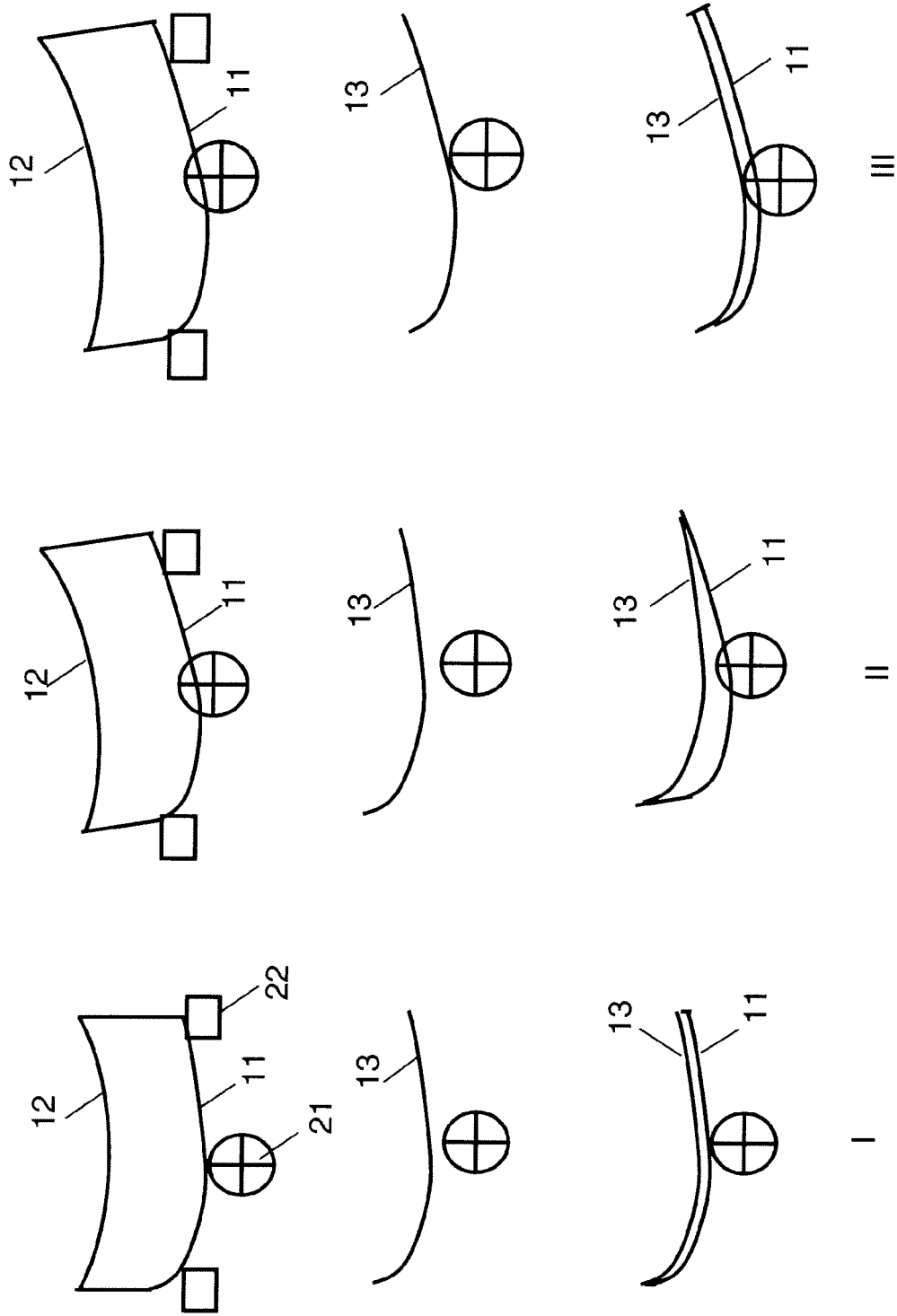

The methods of the embodiments of the invention compensating for an positioning error rather than repositioning a lens member in order to reduce the error. There is no impact on the actual blocking operation since the compensation is performed by software, and thus no modifications to the physical blocking equipment are necessary for the methods to be implemented. The acceptable tolerances for positioning errors may be increased since the errors are compensated for. FIG. 13 illustrates what may happen when the machined surface is incorrectly positioned with respect to a preformed surface in the manufacture of an optical lens. In FIG. 13 the generation of the back surface 13 with respect to the front surface 11 is shown for case I where the lens member is placed at the correct positioning with respect to the blocker 21—in this case the back surface 13 is correctly orientated with respect to and distanced from the front surface 11 according to the optical prescription case II where the lens member is incorrectly placed with respect to the blocker 21—in this case the back surface 13 is incorrectly orientated with respect to and distanced from the front surface 11 and an incorrectly shaped lens is produced which does not correspond to the optical prescription; and case III—where the lens member is incorrectly placed with respect to the blocker 21—in this case the positioning error with respect to a correct positioning is calculated and the back surface is generated according to the positioning error thereby creating an optical lens similar to the optical lens created in case I according to the optical prescription.

By compensating in such a manner for errors in positioning, the optical quality of machined optical lens can be improved, particularly in the manufacture of dual side lens by reducing the dispersion related to the blocking stage of the manufacturing operation. This dispersion results from incorrect positioning of one surface of an optical lens with respect to an opposing surface.

Many further modifications and variations will suggest themselves to those versed in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of manufacturing an optical lens, the method comprising the steps of:
    removably mounting a lens member at a first position on a single blocking surface, the lens member having a surface to be manufactured and an opposing surface to the surface to be manufactured, the opposing surface being in contact with the blocking surface;
    determining the first position of the lens member with respect to the blocking surface while the lens member is on the blocking surface, wherein geometry of the opposing surface and a geometrical configuration of the blocking surface are used to determine positioning of the lens member with respect to the blocking surface;
    comparing the first position of the lens member with a predetermined position in order to determine a positioning error between the first position and the predetermined position;
    determining a surface position of the surface to be manufactured with respect to the blocking surface according to the positioning error;
    determining operational parameters of a lens manufacturing tool according to the determined surface position and configuring the lens manufacturing tool with the operational parameters for manufacturing the surface to be manufactured such that desired optical properties of the optical lens are obtained; and
    using the configured lens manufacturing tool on the lens member mounted on the blocking surface at the first position to manufacture the optical lens therefrom.

2. The method according to claim 1, wherein determining the first position of the lens member comprises the steps of determining:
    orientation of the lens member about vertical z-axis; and
    misalignment of the lens member with respect to the blocking surface,
    wherein geometry of the surface of the lens member in contact with the blocking surface and a geometrical configuration of a blocker ring supporting the lens member is used to determine a position and orientation of the first position of the lens member relative to the blocking surface.

3. The method according to claim 1, wherein determining the first position of the lens member comprises determining a position of lens reference markings on the opposing surface of the lens member with respect to blocker reference markings on the blocking surface.

4. The method according to claim 3, comprising viewing the lens reference markings through the lens member and wherein the refractive properties of the lens member are taken into account when determining the position of the lens reference markings.

5. The method according to claim 4, wherein the refractive properties used comprised at least one of:
    determining a scaling of an image of the reference markings through the lens member;
    determining an orientation of an axis of the reference markings through the lens member; and
    determining a transformation of the reference markings through the lens member.

6. The method according to claim 1, further comprising rotating the surface to be manufactured so that a normal to the surface to be manufactured at a manufacturing axis of rotation is co-linear with a manufacturing axis of rotation, and providing a blocking prism to orientate the lens member so as to compensate for the rotation.

7. A non-transitory computer program product for a data processing device, the computer program product comprising a set of instructions which, when loaded into the data processing device, causes the data processing device to perform the method of claim 1.

8. A non-transitory computer-readable medium having computer-executable instructions to enable a computer system to perform the method of claim 1.

9. The method according to claim 1, further comprising after the mounting step, clamping the mounted lens member in the first position.

10. An apparatus for manufacturing an optical lens, the apparatus comprising:
- a single blocking surface suitable for removably mounting a lens member at a first position, the lens member having a surface to be manufactured and an opposing surface to the surface to be manufactured, the opposing surface being in contact with the blocking surface; and
- a processor for:
  - determining the first position of the lens member with respect to the blocking surface, wherein geometry of the opposing surface and a geometrical configuration of the blocking surface are used to determine positioning of the lens member with respect to the blocking surface;
  - comparing the first position of the lens member with a predetermined position in order to determine a positioning error between the first position and the predetermined position;
  - determining a surface position of the surface to be manufactured according to the positioning error;
  - determining operational parameters of a lens manufacturing tool according to the determined surface position and configuring the lens manufacturing tool with the operational parameters for manufacturing the surface to be manufactured while the lens member is mounted on the blocking surface such that desired optical properties of the optical lens are obtained; and
  - using the configured lens manufacturing tool on the lens member mounted on the blocking surface at the first position to manufacture the optical lens therefrom.

11. The apparatus according to claim 10, wherein the processor is operable to calculate the positioning error by determining a position of lens reference markings on the opposing surface of the lens member with respect to blocker reference markings on the blocking surface.

12. The apparatus according to claim 11, further comprising a digital camera operable to view the markings through the lens member, and wherein the processor is operable to take into account refractive properties of the lens member when determining the position of the lens surface markings.

13. The apparatus according to claim 12, wherein the refractive properties used comprised at least one of:
- determining a scaling of an image of the reference markings through the lens member;
- determining an orientation of an axis of the reference markings through the lens member; and
- determining a transformation of the reference markings through the lens member.

14. The apparatus according to claim 10, wherein the processor is operable to rotate the surface to be manufactured so that a normal to the surface to be manufactured is co-linear with a manufacturing axis of rotation, and further comprising a blocking prism positioned to compensate for the rotation.

15. The apparatus of claim 10, further comprising a clamp positioned to clamp the mounted lens member in the first position.

16. An apparatus for manufacturing an optical lens, the apparatus comprising:
- a single blocking surface suitable for removably mounting a lens member at a first position, the lens member having a surface to be manufactured and an opposing surface to the surface to be manufactured, the opposing surface being in contact with the blocking surface; and
- a processor for:
  - determining the first position of the lens member with respect to the blocking surface, wherein geometry of the opposing surface and a geometrical configuration of the blocking surface are used to determine positioning of the lens member with respect to the blocking surface;
  - comparing the first position of the lens member with a predetermined position in order to determine a positioning error between the first position and a predetermined position;
  - determining a surface position of the surface to be manufactured according to the positioning error; and
  - determining operational parameters of a lens manufacturing tool according to the determined surface position and configuring the lens manufacturing tool with the operational parameters for manufacturing the surface to be manufactured while the lens member is mounted on the blocking surface such that desired optical properties of the optical lens are obtained,
- wherein the processor is operable to determine the position of the lens member by measuring:
- orientation of the lens member about vertical z-axis, and
- misalignment of the lens member, with respect to the blocking surface wherein geometry of a surface of the lens member in contact with the blocking surface and a geometrical configuration of a blocker ring supporting the lens member is used to determine a position and orientation of the lens member relative to the blocking surface; and
- wherein the processor is operable to use the configured lens manufacturing tool on the lens member mounted on the blocking surface at the first position to manufacture the optical lens therefrom.

17. The apparatus of claim 16, further comprising a clamp positioned to clamp the mounted lens member in the first position.

* * * * *